(12) United States Patent
Bratkovski et al.

(10) Patent No.: US 7,764,850 B2
(45) Date of Patent: Jul. 27, 2010

(54) OPTICAL MODULATOR INCLUDING ELECTRICALLY CONTROLLED RING RESONATOR

(75) Inventors: Alexandre Bratkovski, Mountain View, CA (US); Theodore I. Kamins, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/243,782

(22) Filed: Oct. 1, 2008

(65) Prior Publication Data

US 2009/0190875 A1 Jul. 30, 2009

Related U.S. Application Data

(60) Provisional application No. 61/062,478, filed on Jan. 25, 2008.

(51) Int. Cl.
*G02B 6/26* (2006.01)
*G02F 1/025* (2006.01)

(52) U.S. Cl. ................... 385/2; 385/39; 385/50; 385/131

(58) Field of Classification Search .............. None
See application file for complete search history.

(56) References Cited

U.S. PATENT DOCUMENTS 3,748,597 A 7/1973 Reinhart
3,757,174 A * 9/1973 Shigemasa et al. ............ 257/86
3,938,172 A * 2/1976 Lockwood .............. 372/45.012
4,675,518 A * 6/1987 Oimura et al. .............. 250/205
4,784,476 A 11/1988 Schulman
4,997,246 A * 3/1991 May et al. ...................... 385/2
5,040,859 A 8/1991 White
5,157,537 A 10/1992 Rosenblatt
5,801,872 A 9/1998 Tsuji
6,298,177 B1 * 10/2001 House .......................... 385/3
6,323,985 B1 11/2001 Maloney
7,087,837 B1 8/2006 Gretz
7,133,577 B1 * 11/2006 Bratkovski et al. ............ 385/2
2002/0121647 A1 * 9/2002 Taylor ....................... 257/192
2004/0081386 A1 * 4/2004 Morse et al. ................. 385/15

* cited by examiner

*Primary Examiner*—Mike Stahl

(57) ABSTRACT

An optical modulator and related methods are described. In accordance with one embodiment, the optical modulator comprises a waveguide for guiding an optical signal, and further comprises a ring resonator disposed in evanescent communication with the waveguide for at least one predetermined wavelength of the optical signal. The optical modulator further comprises a semiconductor pnpn junction structure that is at least partially coextensive with at least a portion of a resonant light path of the ring resonator. The optical modulator is configured such that the semiconductor pnpn junction structure receives an electrical control signal thereacross. The electrical control signal controls a free carrier population in the resonant light path where coextensive with the pnpn junction structure. A resonance condition of the ring resonator at the predetermined wavelength is thereby controlled by the electrical control signal, and the optical signal is thereby modulated according to the electrical control signal.

18 Claims, 4 Drawing Sheets

VIEW B-B'

OPTICAL MODULATOR INCLUDING ELECTRICALLY CONTROLLED RING RESONATOR

CROSS-REFERENCE TO RELATED APPLICATION

The present application claims priority from provisional application Ser. No. 61/062,478, filed Jan. 25, 2008, the contents of which are incorporated herein by reference in their entirety.

FIELD

This patent specification relates to the modulation of electromagnetic radiation and, more particularly, to the electrooptical modulation of optical radiation.

BACKGROUND

Devices for altering the propagation of electromagnetic radiation, such as by modulation, represent fundamental building blocks for many technological endeavors. Modulation refers generally to the timewise variation of a property of an electromagnetic wave or signal, such as amplitude, phase, spectral content, direction of propagation, etc., according to a time varying control signal or modulation signal. Optical modulation refers to the modulation of at least one optical signal, where optical signal refers to electromagnetic radiation propagating at one or more optical frequencies, which can include infrared, visible, and ultraviolet frequencies. Electrooptical modulation refers to optical modulation according to an electrical modulation signal.

Practical issues often arise in the implementation of electrooptic modulators in regard to one or more of modulation rate, extinction ratio, spectral range of operation, spectral selectivity, insertion loss, noise performance, device cost, and device size. Other issues arise as would be apparent to one skilled in the art in view of the present disclosure.

SUMMARY

In one embodiment, an optical modulator is provided, comprising a waveguide for guiding an optical signal, and further comprising a ring resonator disposed in evanescent communication with the waveguide for at least one predetermined wavelength of the optical signal. The optical modulator further comprises a semiconductor pnpn junction structure that is at least partially coextensive with at least a portion of a resonant light path of the ring resonator. The optical modulator is configured such that the semiconductor pnpn junction structure receives an electrical control signal thereacross. The electrical control signal controls a free carrier population in the resonant light path where coextensive with the pnpn junction structure. A resonance condition of the ring resonator at the predetermined wavelength is thereby controlled by the electrical control signal, and the optical signal is thereby modulated according to the electrical control signal.

Also provided is a method for modulating an optical signal, comprising causing the optical signal to propagate along a waveguide that passes in evanescent proximity to a ring resonator with respect to a predetermined wavelength of the optical signal. The ring resonator defines a resonant light path therearound. The method further comprises applying an electrical control signal across a semiconductor pnpn junction structure that is at least partially coextensive with the resonant light path. The electrical control signal controls a free carrier population in the resonant light path where coextensive with the semiconductor pnpn junction structure to thereby control a resonance condition of the ring resonator at the predetermined wavelength. The optical signal is thereby modulated according to the applied electrical control signal.

Also provided is a method of fabricating an optical modulator, comprising forming an optical waveguide on a semiconductor substrate. The method further comprises forming an optical ring resonator on the semiconductor substrate within an evanescent coupling distance of the optical waveguide with respect to a predetermined wavelength of an optical signal to propagate along the optical waveguide. The optical ring resonator defines a resonant light path therearound. The method further comprises forming a semiconductor pnpn junction structure comprising, in adjacent spatial order, a first layer of relatively heavily p-doped semiconductor material, a second layer of relatively lightly n-doped semiconductor material, a third layer of relatively lightly p-doped semiconductor material, and a fourth layer of relatively heavily n-doped semiconductor material. The method further comprises forming electrical contacts configured to apply an electrical modulation signal between the first and fourth layers of the semiconductor pnpn junction structure. The semiconductor pnpn junction structure is formed relative to the optical ring resonator such that at least one of the second and third layers thereof is integral with at least a portion of the resonant light path.

DETAILED DESCRIPTION

Figure 1A:
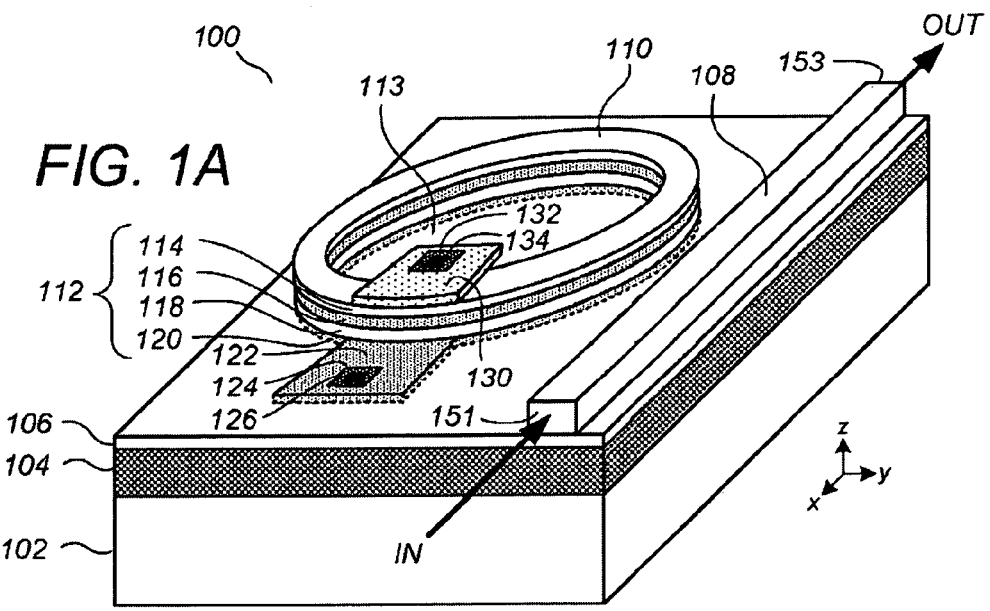
FIG. 1A illustrates a perspective view of an optical modulator according to an embodiment.
Figure 1B:
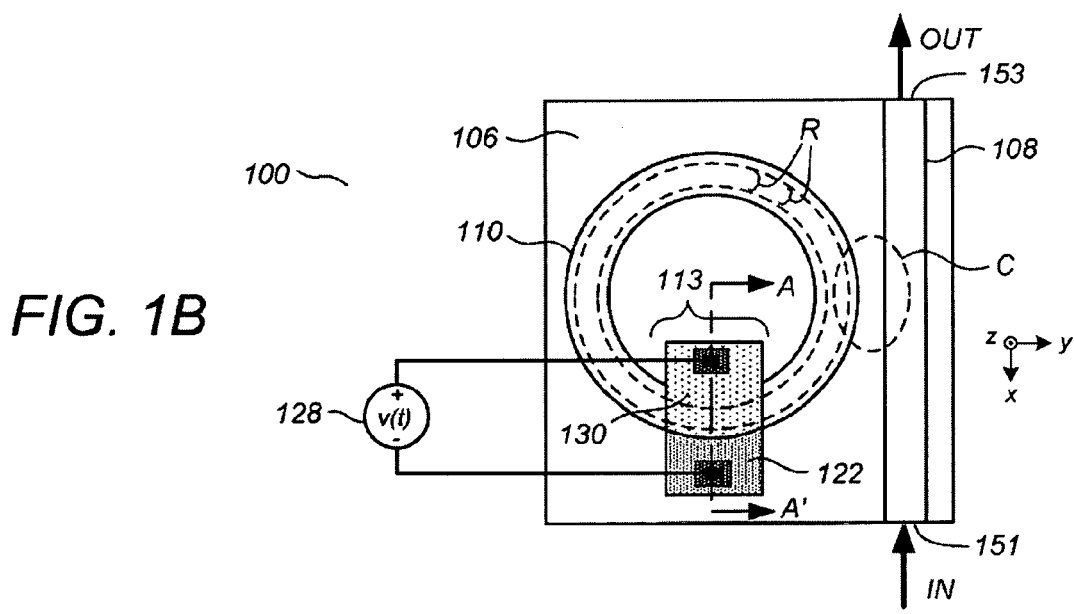
FIG. 1B illustrates a top view of the optical modulator of FIG. 1A.
Figure 1C:
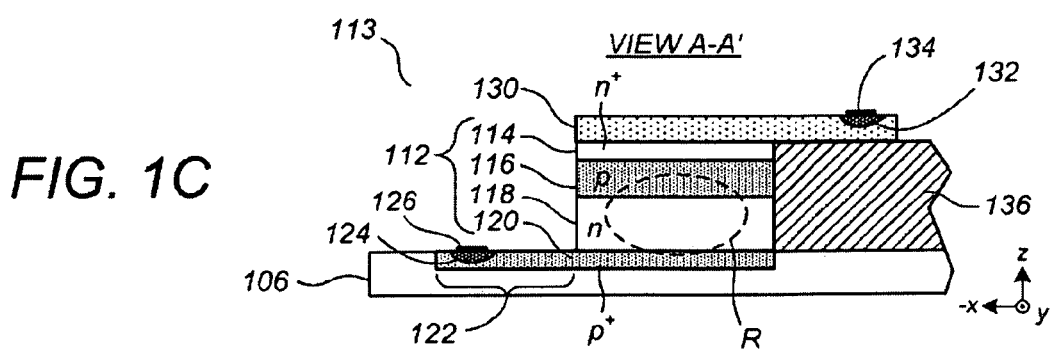
FIG. 1C illustrates a side cutaway view of the optical modulator of FIGS. 1A-1B.

FIGS. 1A-1C illustrate a perspective view, a top view, and a side cutaway view, respectively, of an optical modulator 100 according to an embodiment. The optical modulator 100 is formed on an SOI (silicon on insulator) platform, although it is to be appreciated that the scope of the embodiments is not so limited and that other semiconductor-based integrated circuit optical platforms may be used without departing from the scope of the present teachings. Optical modulator 100 comprises a silicon substrate 102, an insulating layer 104, and an SOI layer 106, the SOI layer 106 usually having a thickness in the sub-micron range. The insulating later 104 can comprise $SiO_2$ or other suitable insulating material.

Although one or more of the embodiments described herein uses silicon (bandgap=1.1 eV) as the primary material for the optical waveguiding and/or active semiconductor devices, which is particularly suitable for operation at telecommunications wavelengths in the general neighborhood of 1000 nm-1600 nm, it is to be appreciated that the scope of the present teachings is not so limited. By way of example, the primary material may alternatively include, or may include in conjunction with silicon, other semiconductor materials such as GaAs (bandgap=1.4 eV), GaN (bandgap=3.4 eV), or other semiconductor materials having other bandgap energies. Likewise, modulation for a variety of different operating wavelengths, including visible wavelengths and other infrared wavelengths, is within the scope of the embodiments.

Optical modulator 100 comprises a waveguide 108 for guiding an optical signal, the waveguide 108 having an input port 151 for receiving an input version IN of the optical signal and an output port 153 for providing a modulated version OUT of the optical signal. Optical modulator 100 further comprises a ring resonator 110 disposed in evanescent communication with the waveguide 108 at a coupling region C for at least one predetermined wavelength of the optical signal being guided by the waveguide 108. Although illustrated as circular in the examples herein, it is to be appreciated that the ring resonator 110 can take on any of a variety of looped shapes (e.g., elliptical, rounded rectangle, oval, etc.), including regular, irregular, symmetric, and non-symmetric looped shapes, without departing from the scope of the present teachings. By evanescent communication, it is meant that the ring resonator 110 is close enough to the waveguide 108 to support evanescent coupling of optical radiation therebetween, a proximity of one wavelength or less being typical. More generally, evanescent communication is facilitated when there is at least partial overlap between the electromagnetic fields of traveling modes supported by the ring resonator 110 and the waveguide 108.

The ring resonator 110 defines a resonant light path R therearound. As used herein, resonant light path R refers generally to a three-dimensional shape defined by the resonant mode(s) of the ring resonator 110, the specifics of which will be dictated by the particular materials, cross-sectional shape, frequencies of operation, etc., of the ring resonator 110, but which will generally occupy some appreciable area within the ring resonator 110 when viewed in cross-section. By way of example, but not by way of limitation, denoted in FIGS. 1B-1C is a generally toroidal resonant optical path R that corresponds to a scenario in which predominantly single-mode propagation is allowed around the ring resonator 110. It is to be appreciated, however, that in other embodiments the resonant optical path may take on different cross-sectional shapes depending on the particular resonant mode(s) allowed.

Optical modulator 100 further comprises an electrically controllable free carrier control structure 113 that includes a pnpn junction structure 112, wherein the pnpn junction structure 112 includes, in adjacent order, a first layer 120, a second layer 118, a third layer 116, and a fourth layer 114. For one embodiment, the first layer 120 comprises relatively heavily p-doped semiconductor material, the second layer 118 comprises a relatively lightly n-doped semiconductor material, the third layer 116 comprises a relatively lightly p-doped semiconductor material, and the fourth layer 114 comprises a relatively heavily n-doped semiconductor material. By way of example, and not by way of limitation, the relatively heavy doping in the first layer 120 can be on the order of $10^{18}$ to $10^{19}$ acceptors/cm$^3$, the relatively light doping in the second layer 118 can be on the order of $10^{15}$ to $10^{17}$ donors/cm$^3$, the relatively light doping in the third layer 116 can be on the order of $10^{15}$ to $10^{17}$ acceptors/cm$^3$, and the relatively heavy doping in the fourth layer 114 can be on the order of $10^{18}$ to $10^{19}$ donors/cm$^3$, although the scope of the embodiments is not so limited.

Free carrier control structure 113 further comprises an extension region 122 of the first layer 120 that extends to an ohmic contact 124, which in turn is electrically coupled to an electrical voltage source 128 via a contact pad 126. Free carrier control structure 113 further comprises an electrical contact region 130 lying directly above the fourth layer 114 that extends to an ohmic contact 132, which in turn is electrically coupled to the electrical voltage source 128 via a contact pad 134. The electrical contact region 130 is preferably nonmetallic, as the presence of a metal nearby to the resonant mode(s) of the ring resonator 110 could bring about substantial signal loss. The electrical contact region 130 can comprise, for example, heavily doped polycrystalline or amorphous silicon. The electrical voltage source 128 provides an electrical control signal v(t), which can vary from static or quasistatic operation frequencies all the way into the many GHz range without departing from the scope of the embodiments. It is to be appreciated that the relatively heavy doping level of the fourth layer 114 (in donors/cm$^3$) may, or may not, be the same as the relatively heavy doping level of the first layer 120 (in acceptors/cm$^3$), and likewise that the relatively light doping level of the second layer 118 (in donors/cm$^3$) may, or may not, be the same as the relatively light doping level of the third layer 116 (in acceptors/cm$^3$). It is to be further appreciated that different sub-areas and/or sub-layers of a particular layer could differ in their doping level without departing from the scope of the present teachings. For example, the fourth layer 114 might be more heavily doped near its top surface (which contacts the electrical contact region 130) than in other sub-layers thereof, with the particular degree of raised doping being dependent on the materials and doping of the electrical contact region 130.

In accordance with an embodiment, modulation of the input optical signal IN by the electrical signal v(t) is brought about by a free carrier effect that perturbs an effective resonant path length of the ring resonator 110 such that the ring resonator 110 is brought into and out of a resonant condition for a predetermined wavelength of the optical signal. As known in the art, semiconductors such as silicon are subject to the free carrier effect, in which the real and/or imaginary components of the refractive index are altered according to a population of free carriers therein. According to an embodiment, the pnpn junction structure 112 is at least partially coextensive with the resonant optical path R along at least one of the second layer 118 and third layer 116. As such, a free carrier population change in the second layer 118 and/or third layer 116 means that there is also a free carrier population change in the coextensive region of the resonant optical path R. Thus, by virtue of the effect of the electrical signal v(t) on the free carrier populations in the second layer 118 and/or third layer 116, the electrical signal v(t) at least partially controls a free carrier population in at least a portion of the resonant light path R. In turn, the corresponding refractive index variations due to the free carrier effect along that coextensive portion results in changes to the effective resonant path length of the ring resonator 110, bringing it into and out of the resonance condition for the predetermined wavelength and thereby affecting the amount of evanescent coupling between the waveguide 108 and the ring resonator 110 for that predetermined wavelength. The input optical signal IN is thereby modulated according to the electrical signal v(t), resulting in a modulated version of the optical signal OUT having a component at the predetermined wavelength that is reduced according to amounts thereof evanescently coupled into the ring resonator 110. Energy coupling into the ring resonator 110 is temporarily stored therein (according to its "Q" factor) and ultimately dissipated.

Figure 2A:
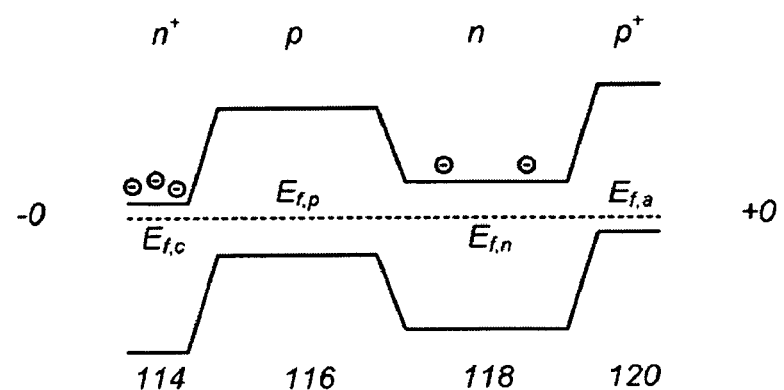
FIGS. 2A-2C illustrate energy band diagrams associated with a pnpn junction structure of the optical modulator of FIGS. 1A-1C.
Figure 2B:
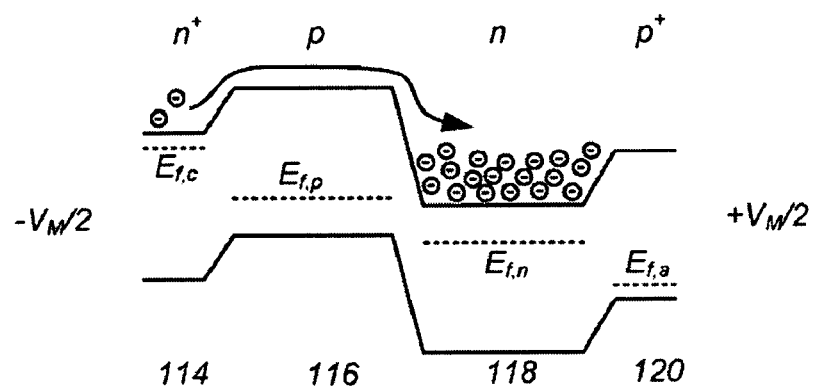
Figure 2C:
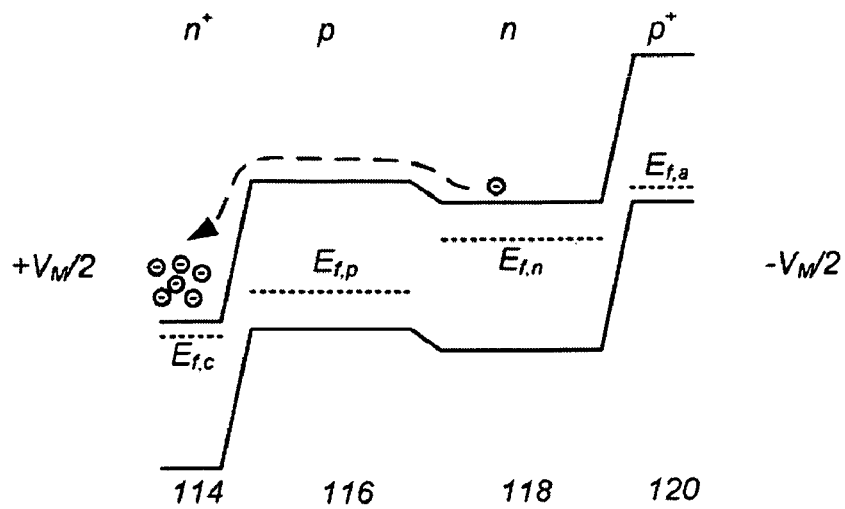

FIGS. 2A-2C illustrate energy band diagrams associated with the pnpn junction structure 112 of the optical modulator 100. By way of analogy to thyristors, the first layer 120 can be thought of as an anode of the pnpn junction structure 112 having a Fermi level $E_{f,a}$, while the fourth layer 114 can be thought of as a cathode of the pnpn junction structure 112 having a Fermi level $E_{f,c}$. FIG. 2A illustrates an energy band diagram applicable for free electron carriers when there is no applied voltage. As illustrated in FIG. 2B, when there is a positive voltage $V_M$ applied between the anode and cathode, a high population of free electron carriers is injected into the lightly n-doped second layer 118. As illustrated in FIG. 2C, when there is a negative voltage $V_M$ applied between the anode and cathode, free electron carriers are evacuated from the lightly n-doped second layer 118. Complementary activity occurs for hole populations (not shown) with respect to the lightly p-doped third layer 116. The particular magnitude of the driving voltage $V_M$ would be readily determinable by the skilled artisan in view of the present disclosure as affected by the particular dopant levels, semiconductor materials, and pnpn geometry used. Typical values of $V_M$ for silicon-based implementations (bandgap=1.1 eV) would be in the range of 2-12 volts.

Advantageously, the use of a pnpn junction structure as a mechanism for free carrier injection into, and evacuation from, the resonant light path R of the ring resonator 110 facilitates a very high electrooptical modulation rate capability for the optical signal traveling along the waveguide 108, with achievable modulation rates extending into the tens of GHz range, although the scope of achievable performance in accordance with the embodiments is not necessarily so limited. Moreover, because the free carrier effect is used indirectly (by perturbation of the ring resonator 110 into and out of a resonant condition) rather than directly (i.e., direct refractive index control in the waveguide 108), a very high modulation depth/extinction ratio can be achieved, even at such high modulation rates. It is to be appreciated that the energy band diagrams of FIGS. 2A-2C represent a relatively simplified explanation of the physics underlying the operation of the pnpn junction structure 112, and that there may be combinations of electron and hole population variations in one or more of the layers 116 and 118 that are simultaneously occurring in various ways. However, because device operation is based on perturbation of a resonance condition, precise a priori determination of the particular mechanisms and amounts by which the free carrier populations vary is of lesser importance than the more direct and concrete fact that they will vary in some way, and that they will do so very quickly responsive to applied voltage changes, in the disclosed pnpn junction structures.

Another advantage of using the pnpn junction structure 112 in conjunction with indirect, perturbation-based modulation is that many design parameters and design tolerances for the optical modulator 100 can be somewhat relaxed. For example, there can be substantial freedom of design in (a) the particular circumferential extent of the layers 114-120 relative to the ring resonator 110, (b) the particular circumferential extent of the electrical contact region 130 relative to the fourth layer 114, and (c) the particular circumferential extent of the extension region 122 relative to the first layer 120. Thus, for example, in the embodiment of FIGS. 1A-1C, the layers 114-120 of the pnpn junction structure 112 extend all the way around the ring resonator 110, while the electrical contact region 130 and the extension region 122 only cover an arc of about 20 degrees therearound. In other embodiments, the layers 114-120 of the pnpn junction structure 112 can be limited to a small arc of 20 degrees or less, the remainder of the ring resonator 110 being formed by undoped or lightly doped silicon. Many other variations of these parameters are also possible and are within the scope of the present teachings.

Although illustrated as integral with the SOI layer 106 in the embodiment of FIGS. 1A-1C, which is advantageous for fabrication purposes, the first layer 120 may be placed above the SOI layer 106 in other embodiments. In still other embodiments, the first layer 120 may extend through the entire thickness of the SOI layer 106 down to the insulating layer 104, which is advantageous in that series resistance is reduced. In still other embodiments, the SOI layer 106 can be removed, such as by etching, from areas that are not directly underneath optical structures such as the ring resonator 110 and waveguide 108 and associated electrical contact regions, whereby the oxide of the SOI structure (i.e. the insulating layer 104) forms the top surface of the optical modulator 100 at areas not occupied by the optical structures and associated electrical contact regions. In still other embodiments, the vertical orientation of the pnpn junction structure can be reversed, i.e., the relatively heavily p-doped first layer 120 can be on top and the relatively heavily n-doped fourth layer 114 can be on the bottom. Although omitted from FIG. 1A and shown only partially in FIG. 1C, there can optionally be an oxide layer 136 disposed outside and/or inside the ring resonator 110 as may be necessary and/or convenient to facilitate fabrication or other operational aspects of the overall device. Other oxide layers, which are omitted from the drawings hereinbelow for clarity, may be incorporated as necessary for fabrication, isolation of electrical leads, and miscellaneous other operational aspects of the overall device.

By way of nonlimiting example, typical dimensions for a particular case in which single-mode propagation is intended at a telecommunications wavelength of λ=1550 nm for a silicon-based structure (bandgap=1.1 eV, refractive index n=3.4) are that the ring resonator 110 and waveguide 108 can each have a cross-sectional width of about 450 nm, the separation between the ring resonator 110 and the waveguide 108 in the coupling region C can be about 200 nm, the diameter of the ring resonator 110 can be about 10 μm, and the thickness of the layers 120, 118, 116, and 114 can be about 100 nm, 250 nm, 250 nm, and 100 nm, respectively. However, it is to be appreciated that a wide variety of different operational modes, material systems, and operational wavelengths are within the scope of the present teachings, and that an associated wide variety of device dimensions are also within the scope of the present teachings.

For purposes of device design, the cross-sectional extent of the resonant optical path R could be estimated, using computer simulation for example, by identifying isocontours on a field intensity map of the resonant mode(s) having a predetermined percentage (for example, 10%, 20%, or 50%) of a maximum field intensity. It is to be appreciated, however, that many different methods for estimating an extent of the resonant optical path R would be apparent to the skilled artisan in view of the present disclosure. Advantageously, because operation of the optical modulator 100 is based on perturbing the ring resonator 110 into and out of a resonant condition, the degree of overlap (coextensiveness) of the second layer 118 and/or third layer 116 with the resonant light path R does not need to be of extraordinarily high precision, and therefore highly precise a priori knowledge of the resonant optical path R will not be required in many cases.

Figure 3A:
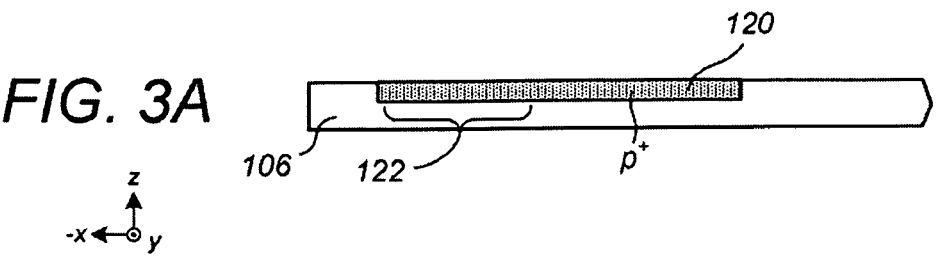
FIGS. 3A-3C illustrate side cutaway views of an optical modulator during selected stages of fabrication according to an embodiment.
Figure 3B:
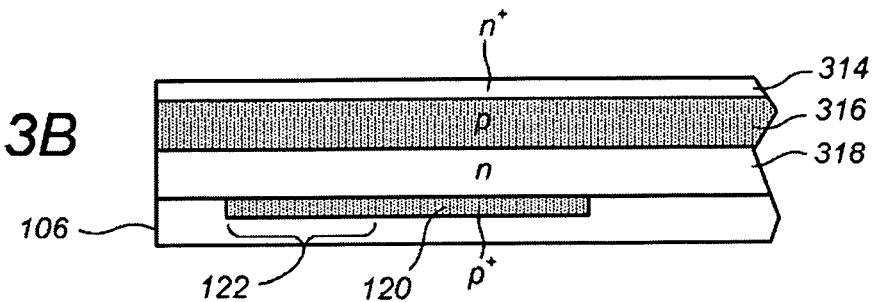
Figure 3C:
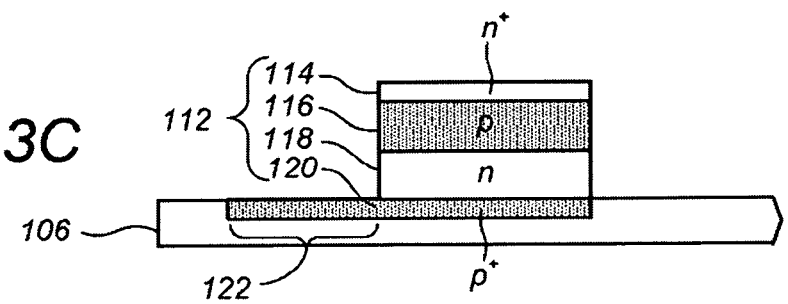

FIGS. 3A-3C illustrate side cutaway views of the optical modulator 100 during selected stages of fabrication thereof according to an embodiment. Layer 120, including the extension region 122, is formed in the SOI layer 106 (FIG. 3A) by relatively heavy p-doping of the relevant area using ion implantation or gas phase diffusion. A spatially uniform layer 318 is epitaxially grown, typically with relatively light n-type dopant added during epitaxial growth. Alternatively, the relatively light, n-type dopant could be added after epitaxial growth. Then a spatially uniform layer 316 is epitaxially grown over layer 318 with relatively light p-type dopant added during epitaxial growth. Alternatively, the relatively light p-dopant can be added after epitaxial growth. Subsequently, a spatially uniform layer 314 is epitaxially grown over layer 316, with heavy n-type dopant added during epitaxial growth or subsequent to epitaxial growth (FIG. 3B). In one or more embodiments, more dopant may be added to the top of the layer 314 after epitaxial growth, which can provide reduced series resistance and/or better electrical connection with the electrical contact layer 130 to be formed later, the particular amount of added doping depending on the material, conductance, and formation technique to be used for the contact layer 130. The layers 314-318 are then vertically etched to form the desired layers 114-118, which also form the waveguide structure of the overall ring resonator 110 (FIG. 3C). In other embodiments (not shown) in which the pnpn junction structure does not circle all the way around the ring resonator 110, the layers 314-318 can be etched away for all areas except the pnpn junction structure, such that they stand alone above the remainder of the SOI layer 106, and then the remainder of the ring resonator 110 can be formed by subsequent steps of epitaxial Si growth and etching.

Figure 4:
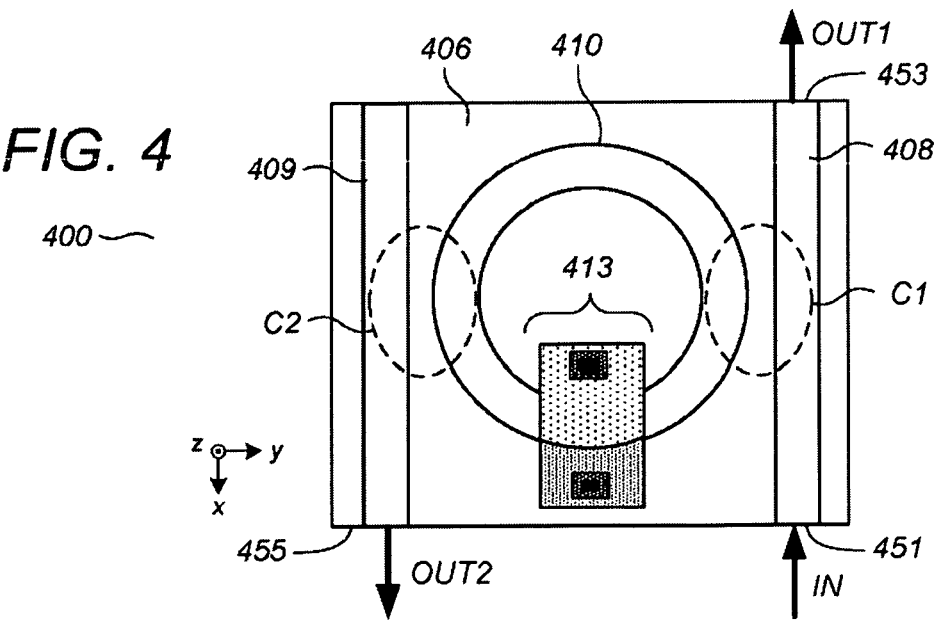
FIG. 4 illustrates a top view of an optical modulator according to an embodiment.

FIG. 4 illustrates a top view of an optical modulator 400 according to an embodiment, comprising an SOI layer 406, a waveguide 408, a ring resonator 410, and a free carrier control structure 413 similar to the SOI layer 106, waveguide 108, ring resonator 110, and free carrier control structure 113 of FIG. 1, supra, except that there is also provided an additional waveguide 409 such that add/drop modulation is provided. By way of example and not by way of limitation, the optical modulator 400 may be configured such that, for a first voltage applied to the free carrier control structure 413, there is a resonant condition at a predetermined wavelength $\lambda_1$, while for a second applied voltage there is no resonant condition for any relevant wavelength. An input optical signal IN may be provided at an input port 451 comprising multiple wavelengths $\lambda_0\lambda_1\lambda_2\lambda_3$. When the second voltage is applied, an output optical signal OUT1 is provided at a first output port 453 comprising all of the wavelengths $\lambda_0\lambda_1\lambda_2\lambda_3$, while no signal is provided at a second output port OUT2. When the first voltage is applied, the signal at $\lambda_1$ evanescently couples into the ring resonator 410 across a first coupling region C1 and evanescently couples into the waveguide 409 across a second coupling region C2, whereby OUT1 comprises only $\lambda_0\lambda_1\lambda_2\lambda_3$ while OUT2 comprises $\lambda_1$.

A rich variety of other add/drop modulation scenarios can also be provided by the optical modulator 400. By way of nonlimiting example, the optical modulator 400 may be instead be configured such that, for the second applied voltage, the resonance condition shifts from $\lambda_1$ to a neighboring channel $\lambda_2$. Thus, when the first voltage is applied, OUT1 comprises $\lambda_0\lambda_1\lambda_2\lambda_3$ while OUT2 comprises $\lambda_1$, whereas when the second voltage is applied, OUT1 comprises $\lambda_0\lambda_1\lambda_2\lambda_3$ while OUT2 comprises $\lambda_2$.

Figure 5:
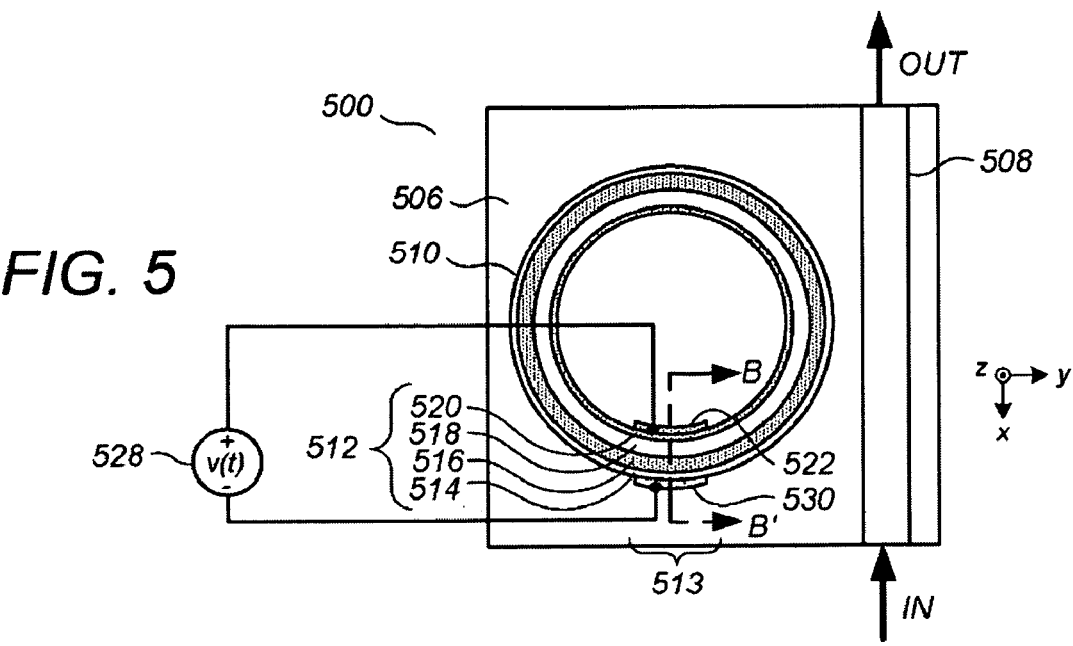
FIG. 5 illustrates a top view of an optical modulator according to an embodiment.

FIG. 5 illustrates a top view of an optical modulator 500 according to an embodiment differing from the embodiment of FIGS. 1A-1C, supra, in that the layers of the pnpn junction structure are now oriented vertically relative to the substrate. Optical modulator 500 comprises an SOI layer 506, a waveguide 508, a ring resonator 510, and a free carrier control structure 513. The free carrier control structure 513 comprises a first layer 520 comprising relatively heavily p-doped semiconductor material, a second layer 518 comprising relatively lightly n-doped semiconductor material, a third layer 516 comprising a relatively lightly p-doped semiconductor material, and a fourth layer 514 comprising relatively heavily n-doped semiconductor material. As with the embodiment of FIGS. 1A-1C, supra, the layers of the pnpn junction structure 512 are illustrated as extending around the entire ring resonator 510, although the scope of the present teachings is not so limited. The free carrier control structure 513 further comprises electrical contact regions 522 and 530 formed from suitable nonmetallic conducting materials disposed adjacent to first layer 520 and fourth layer 514, respectively, such that an external electrical modulation voltage v(t) from a voltage source 528 can be applied thereacross. In an alternative embodiment (not shown), the free carrier control structure 513 may be disposed directly atop the oxide layer (insulating layer) that underlies the SOI layer 506, in which case the SO layer 506 is effectively omitted from the final structure, except in the extension region 122. For this alternative embodiment, device fabrication in such case is made somewhat easier in that precisely stopping a downward etch at a boundary between epitaxially grown layers and the original Si layer of an SOI wafer presents at least some degree of difficulty, whereas it is generally easier to simply etch down to the oxide layer (insulating layer) of the SOI structure. In still other embodiments, the inside-to-outside order of the of the pnpn junction structure relative to the ring resonator 510 can be reversed, i.e., the relatively heavily p-doped first layer 520 can be on the outside and the relatively heavily n-doped fourth layer 514 can be on the inside.

For the embodiment of FIGS. 1A-1C, supra, each layer of the pnpn junction structure 112 is substantially parallel to a plane of the ring resonator 110, whereby free carriers are injected into, and evacuated from, the layers 116/118 in a vertical direction, i.e., substantially perpendicular to the plane of the ring resonator 110. In contrast, for the embodiment of FIG. 5, each layer of the pnpn junction structure 512 is substantially perpendicular to the plane of the ring resonator 510, whereby free carriers are injected into, and evacuated from, the layers 516/518 in a horizontal direction, i.e., substantially parallel to the plane of the ring resonator 510.

Figure 6A:
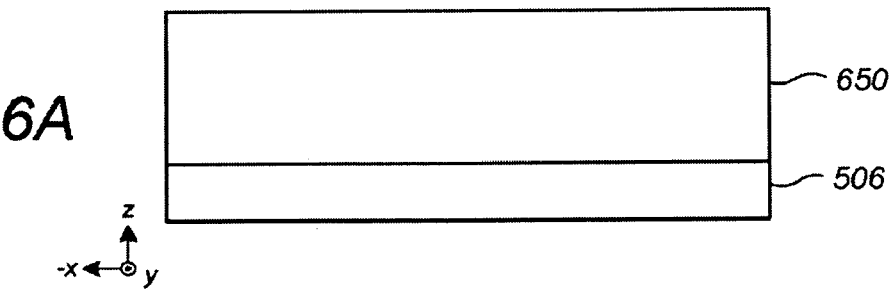
FIGS. 6A-6C illustrate side cutaway views of an optical modulator during selected stages of fabrication according to an embodiment.
Figure 6B:
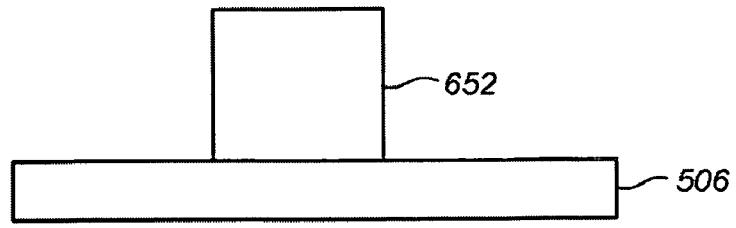
Figure 6C:
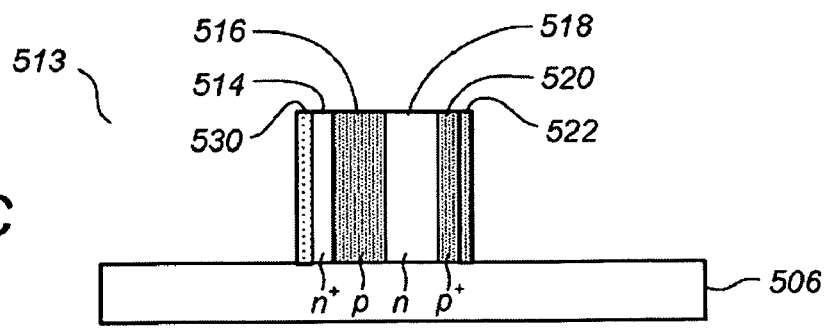

FIGS. 6A-6C illustrate side cutaway views of the optical modulator 500 of FIG. 5 during selected stages of fabrication thereof according to an embodiment. A Si layer 650 is epitaxially grown atop the SOI layer 506 (FIG. 6A) such that it is thick enough to accommodate the ultimate height of the ring resonator 510. Preferably, the Si layer 650 is undoped or is of uniform light doping. The layer 650 is masked and vertically etched to form a structure 652 corresponding to the desired ring-shaped confinement region of the ring resonator 510 (FIG. 6B). In an alternative embodiment (not shown), the etching of the layer 650 to define the structure 652 can proceed through the SOI layer 506 down to the underlying oxide, which, as discussed above, usually makes device fabrication easier. Subsequently, using a lateral gas-phase diffusion process, the structure 652 is differentially doped to form the desired vertically-oriented layers of the pnpn junction structure 512 having the desired doping profile (FIG. 6C). As known in the art, the differential doping process takes advantage of the fact that certain dopants for p-type doping (e.g., boron) will diffuse faster than certain dopants for n-type doping (e.g., arsenic), and therefore the dopant concentrations in the lateral gas phase diffusion process can be judiciously selected such that the desired lateral doping profile is achieved. For the alternative embodiment (not shown) in which the etching of FIG. 6B would proceed through the SOI layer 506 down to the underlying oxide, the remaining SOI layer 508 underneath the structure 652 would also become differentially doped and would effectively become part of the free carrier control structure 513. According to yet another embodiment (not shown), the free carrier control structure can be formed using selective lateral gas-phase epitaxy.

It is to be appreciated that many other fabrication techniques may be applicable for fabricating an optical modulator according to one or more of the embodiments, as would be apparent to a person skilled in the art in view of the present disclosure. Without limitation, fabrication of optical devices according to one or more of the embodiments can be achieved using methods including: deposition methods such as chemical vapor deposition (CVD), metal-organic CVD (MOCVD), plasma enhanced CVD (PECVD), chemical solution deposition (CSD), sol-gel based CSD, metal-organic decomposition (MOD), thermal evaporation/molecular beam epitaxy (MBE), sputtering (DC, magnetron, RF), and pulsed laser deposition (PLD); lithographic methods such as optical lithography, extreme ultraviolet (EUV) lithography, x-ray lithography, electron beam lithography, focused ion beam (FIB) lithography, and nanoimprint lithography; removal methods such as wet etching (isotropic, anisotropic), dry etching, reactive ion etching (RIE), ion beam etching (IBE), reactive IBE (RIBE), chemical-assisted IBE (CAIBE), and chemical-mechanical polishing (CMP); modifying methods such as radiative treatment, thermal annealing, ion beam treatment, and mechanical modification; and assembly methods such as wafer bonding, surface mount, and other wiring and bonding methods.

Whereas many alterations and modifications of the embodiments will no doubt become apparent to a person of ordinary skill in the art after having read the foregoing description, it is to be understood that the particular embodiments shown and described by way of illustration are in no way intended to be considered limiting. By way of example, although one or more of the embodiments supra incorporates a homojunction pnpn structure (i.e., the same semiconductor material having differently doped regions defining the pnpn layers), in other embodiments the pnpn structures can be heterojunction pnpn structures (i.e., different materials having different bandgaps making up the differently doped pnpn layers). It is also to be appreciated that, commensurate with the top-to-bottom reversibility of the pnpn junction structure layers discussed with respect to FIG. 1A and the outside-to-inside reversibility of the pnpn junction structure layers discussed with respect to FIG. 5, that reference to pnpn junction structures in the present disclosure also includes "npnp" junction structures.

By way of further example, although one or more of the embodiments supra incorporates a single ring resonator and is described in the context of a single input optical signal being modulated to provide single or dual modulated output versions thereof, it is to be appreciated that the scope of the present teachings is not so limited. In other embodiments, multiple ring resonators may be coupled to one or more input optical waveguides and/or to each other in any of a variety of configurations for providing multi-input, multi-channel, and/or multi-output modulation scenarios, including a rich variety of programmable channel add/drop scenarios, and further including bidirectional modulation features (including bidirectional add/drop scenarios) under optical reciprocity principles. Especially in view of the rapid modulation rates, high extinction ratios, and relatively small footprints provided, the present teachings can be advantageously applied in the context of integrated on-chip optical communications or integrated chip-to-chip optical communications, although the scope of the present teachings is not so limited. Thus, reference to the details of the described embodiments is not intended to limit their scope.

What is claimed is:

1. An optical modulator, comprising:
   a waveguide for guiding an optical signal;
   a ring resonator disposed in evanescent communication with said waveguide for at least one predetermined wavelength of the optical signal; and
   a semiconductor pnpn junction structure at least partially coextensive with at least a portion of a resonant light path of said ring resonator, said optical modulator being configured such that said semiconductor pnpn junction structure receives an electrical control signal thereacross, the electrical control signal controlling a free carrier population in said resonant light path where coextensive with said pnpn junction structure to control a resonance condition of said ring resonator at said predetermined wavelength, said optical signal being thereby modulated according to said electrical control signal,
   wherein said semiconductor pnpn junction structure comprises:
   a first layer comprising a relatively heavily p-doped semiconductor material;
   a second layer adjacent to said first layer and comprising a relatively lightly n-doped semiconductor material;
   a third layer adjacent to said second layer and comprising a relatively lightly p-doped semiconductor material; and
   a fourth layer adjacent to said third layer and comprising a relatively heavily n-doped semiconductor material;
   wherein said resonant light path passes through at least one of said second and third layers.

2. The optical modulator of claim 1, further comprising:
   a first electrical contact coupled to said first layer; and
   a second electrical contact coupled to said fourth layer;
   wherein said electrical control signal is applied to said pnpn junction structure through said first and second electrical contacts.

3. The optical modulator of claim 1, wherein said free carriers comprise one of injected electrons and holes, and wherein said resonant light path passes through said second layer of said pnpn junction structure.

4. The optical modulator of claim 1, wherein said free carriers comprise one of injected holes and electrons, and wherein said resonant light path passes through said third layer of said pnpn junction structure.

5. The optical modulator of claim 1, wherein each of said first, second, third, and fourth layers is substantially parallel to a plane of said ring resonator, whereby said free carriers are injected into, and evacuated from, at least one of said second and third layers in a direction substantially perpendicular to said plane of said ring resonator.

6. The optical modulator of claim 1, wherein each of said first, second, third, and fourth layers is substantially perpendicular to a plane of said ring resonator, whereby said free carriers are injected into, and evacuated from, at least one of said second and third layers in a direction substantially parallel to said plane of said ring resonator.

7. The optical modulator of claim 1, said waveguide passing near said ring resonator in an evanescent coupling region, said optical modulator further comprising:

an input port for receiving the optical signal, said waveguide guiding said optical signal toward said evanescent coupling region; and an output port for providing a modulated version of the optical signal, said waveguide guiding said modulated version toward said output port from said evanescent coupling region.

8. The optical modulator of claim 1, said waveguide being a first waveguide and passing near said ring resonator in a first evanescent coupling region, said optical modulator further comprising:

a second waveguide passing near said ring resonator in a second evanescent coupling region;

an input port for receiving the optical signal, said first waveguide guiding said optical signal toward said first evanescent coupling region;

a first output port for providing a first modulated version of the optical signal, said first waveguide guiding said first modulated version toward said first output port from said first evanescent coupling region; and a second output port for providing a second modulated version of the optical signal, said second waveguide guiding said second modulated version toward said second output port from said second evanescent coupling region.

9. The optical modulator of claim 1, wherein said predetermined wavelength is in a range of 1000 nm -1600 nm, and wherein the semiconductor material for each of said first, second, third, and fourth layers comprises silicon.

10. A method for modulating an optical signal, comprising:

causing the optical signal to propagate along a waveguide that passes in evanescent proximity to a ring resonator with respect to a predetermined wavelength of the optical signal, the ring resonator defining a resonant light path therearound; and applying an electrical control signal across a semiconductor pnpn junction structure that is at least partially coextensive with the resonant light path, the electrical control signal controlling a free carrier population in the resonant light path where coextensive with the semiconductor pnpn junction structure to thereby control a resonance condition of the ring resonator at the predetermined wavelength, the optical signal being thereby modulated according to the applied electrical control signal, wherein the semiconductor pnpn junction structure comprises a first layer comprising a relatively heavily p-doped semiconductor material, a second layer adjacent to the first layer comprising a relatively lightly n-doped semiconductor material, a third layer adjacent to the second layer comprising a relatively lightly p-doped semiconductor material, and a fourth layer adjacent to the third layer comprising a relatively heavily n-doped semiconductor material, wherein said resonant light path passes through at least one of said second and third layers of the semiconductor pnpn junction structure.

11. The method of claim 10, wherein the electrical control signal is applied between a first electrical contact coupled to the first layer and a second electrical contact coupled to the fourth layer.

12. The method of claim 10, wherein the free carriers comprise one of injected electrons and holes, and wherein the resonant light path passes through the second layer of the pnpn junction structure.

13. The method of claim 10, wherein the free carriers comprise one of injected holes and electrons, and wherein the resonant light path passes through the third layer of the pnpn junction structure.

14. The method of claim 10, wherein each of the first, second, third, and fourth layers is substantially parallel to a plane of the ring resonator, whereby the free carriers are injected into, and evacuated from, at least one of the second and third layers in a direction substantially perpendicular to the plane of the ring resonator.

15. The method of claim 10, wherein each of the first, second, third, and fourth layers is substantially perpendicular to a plane of the ring resonator, whereby the free carriers are injected into, and evacuated from, at least one of the second and third layers in a direction substantially parallel to the plane of the ring resonator.

16. A method of fabricating an electrooptical modulator, comprising:

forming an optical waveguide on a semiconductor substrate;

forming an optical ring resonator on said semiconductor substrate within an evanescent coupling distance of said optical waveguide with respect to a predetermined wavelength of an optical signal to propagate along said optical waveguide, said optical ring resonator defining a resonant light path therearound; and forming a semiconductor pnpn junction structure comprising, in adjacent spatial order, a first layer of relatively heavily p-doped semiconductor material, a second layer of relatively lightly n-doped semiconductor material, a third layer of relatively lightly p-doped semiconductor material, and a fourth layer of relatively heavily n-doped semiconductor material; and forming electrical contacts configured to apply an electrical modulation signal between said first and fourth layers of said semiconductor pnpn junction structure;

wherein said semiconductor pnpn junction structure is formed relative to said optical ring resonator such that at least one of said second and third layers thereof is integral with at least a portion of said resonant light path.

17. The method of claim 16, wherein each of the first, second, third, and fourth layers is substantially parallel to a plane of the ring resonator, whereby carrier injection/evacuation currents resulting from variations in said electrical modulation signal flow through said one of said second and third layers in a direction generally perpendicular to said semiconductor substrate.

18. The method of claim 16, further comprising:

forming a ring-shaped confinement region comprising a semiconductor material that is uniformly undoped or lightly doped, said resonant light path being defined substantially parallel to said semiconductor substrate; and differentially doping said ring-shaped confinement region in a lateral gas-phase diffusion process to define said first, second, third, and fourth layers, whereby said first, second, third, and fourth layers are substantially perpendicular to said semiconductor substrate, and whereby carrier injection/evacuation currents resulting from variations in said electrical modulation signal flow through said one of said second and third layers in a direction generally parallel to said semiconductor substrate.

* * * * *